United States Patent
Norlander

(10) Patent No.: US 8,424,556 B2
(45) Date of Patent: Apr. 23, 2013

(54) VALVE WITH A DELTA P-FUNCTION AND FLOW LIMITING FUNCTION

(75) Inventor: Per Norlander, Vargarda (SE)

(73) Assignee: Tour & Andersson AB, Ljung (SE)

( * ) Notice: Subject to any disclaimer, the term of this patent is extended or adjusted under 35 U.S.C. 154(b) by 77 days.

(21) Appl. No.: 13/133,415

(22) PCT Filed: Jan. 22, 2010

(86) PCT No.: PCT/SE2010/000012
§ 371 (c)(1),
(2), (4) Date: Jun. 8, 2011

(87) PCT Pub. No.: WO2010/090572
PCT Pub. Date: Aug. 12, 2010

(65) Prior Publication Data
US 2011/0240148 A1    Oct. 6, 2011

(30) Foreign Application Priority Data
Feb. 5, 2009 (SE) .......................... 0900133

(51) Int. Cl.
*F16K 11/00* (2006.01)
(52) U.S. Cl.
USPC .......................... 137/240; 137/501; 137/557
(58) Field of Classification Search ................ 137/240, 137/501, 557, 487, 488, 613, 614.19
See application file for complete search history.

(56) References Cited

U.S. PATENT DOCUMENTS

| | | | |
|---|---|---|---|
| 3,115,892 A | 12/1963 | Brewer | |
| 5,301,710 A * | 4/1994 | Marandi | 137/240 |
| 5,566,711 A * | 10/1996 | Glansk et al. | 137/557 |
| 6,725,880 B1 | 4/2004 | Liu | |
| 7,055,547 B2 * | 6/2006 | Wang | 137/557 |
| 7,543,596 B2 | 6/2009 | Laverdiere et al. | |
| 7,621,461 B2 * | 11/2009 | Trantham et al. | 236/93 A |
| 7,735,514 B2 * | 6/2010 | Marstorp et al. | 137/501 |
| 7,828,012 B2 * | 11/2010 | Hegberg et al. | 137/557 |
| 8,152,134 B2 * | 4/2012 | Stenberg | 137/557 |
| 2005/0039797 A1 | 2/2005 | Carlson | |
| 2010/0043893 A1 | 2/2010 | Stenberg | |

FOREIGN PATENT DOCUMENTS

| | | |
|---|---|---|
| SE | 0602073 | 4/2008 |
| WO | 2004/010474 A2 | 1/2004 |
| WO | 2008/041898 A1 | 4/2008 |

\* cited by examiner

*Primary Examiner* — Eric Keasel
(74) *Attorney, Agent, or Firm* — Davis & Bujold, PLLC

(57) ABSTRACT

A device for regulating the flow in a heating and cooling system. The flow is controlled by a complete valve realized as a combination of a difference pressure valve (5) and a flow controlling valve (6) where the complete valve construction allows flushing of the tube system where the valve is mounted. A first static pressure (P1) in the inlet (2), a second static pressure (P2) in the intermediate chamber (4) and a third static pressure (P3) in the outlet (3) are measured by the measuring nipples (27*a*, 27*b*) and the difference between the second and the third static pressures (P2, P3) is adjustable during operation.

8 Claims, 7 Drawing Sheets

VALVE WITH A DELTA P-FUNCTION AND FLOW LIMITING FUNCTION

This application is a National Stage Completion of PCT/SE2010/000012 filed Jan. 22, 2010 which claims priority from Swedish application serial no. 0900133-0 filed Feb. 5, 2009.

FIELD

The present invention relates to a device for regulating the flow quantity in a heating and cooling system based on water.

BACKGROUND

The main purpose for the device according to the invention is to control the flow through the valve so that in a real operational case a flow is obtained and an output power from the system corresponds to the demand that has to be fulfilled, and this in such a way that no problem with sound or power control will arise.

Both those variables are coupled to the static pressure level and to the fall of pressure existing in the medium that the complete valve has to control.

Because the control valve has to fulfill its function at varying system conditions the valve is carried out as a combination of a flow control valve and a differential pressure valve. The differential pressure valve limits the differential pressure—the Δp-value—to which the control valve is exposed. Because the Δp-value is limited to a selected value, for example 10 kPa, and since this value additionally is more or less constant, independent of variations of the pressure level in the entire system, the best conditions for a good control function are obtained. Consequently the control valve can be dimensioned in an optimal way, which leads to that the system in which the control valve is working can be controlled so that for example a room temperature is held within selected values without fluctuations in temperature or that for instance sound problems occurs.

SUMMARY

By the present invention a number of advantages in relation to existing constructions are obtained according to the following:

the construction of the valve permits a flushing through in the tube system, or the like, where the complete valve is mounted.

all the pressure levels that exists before, in and after the valve are measurable.

the Δp-value is adjustable also during operation.

a venting function is provided in the Δp-part.

a constructive arrangement which means that both components that forms the Δp-function and the control valve function are made as a complete semi manufactured article which offer quality-technical and logistical advantages.

The constructive embodiment of the present invention is described in detail below.

In addition, the invention has to bring the state of the art further in different aspects. This is realized by the present invention by a device of the below described art.

Further features and advantages of the invention are evident from the following description, referring to attached drawings showing preferred, but not limiting embodiments.

BRIEF DESCRIPTION OF THE DRAWINGS

In the present shown and described embodiments of a control valve with integrated Δp-function.

DETAILED DESCRIPTION OF THE DRAWINGS

Figure 1:
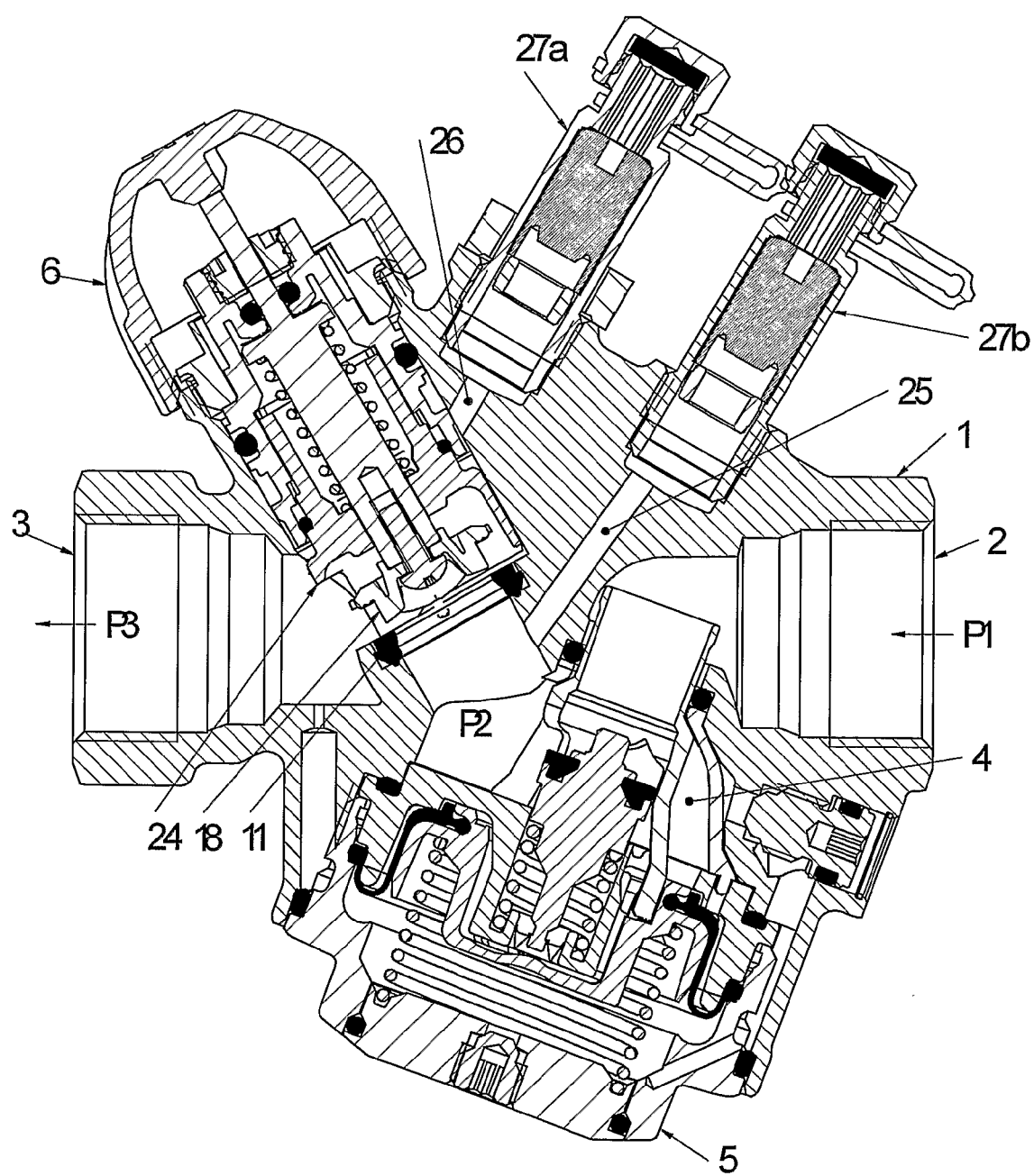
FIG. 1 shows a complete valve according to the invention

FIG. 1 shows a complete valve according to the invention. The main part is constituted by a valve body 1 which is provided with an inlet 2 and an outlet 3.

Preferably the valve body is made of an alloy of brass and the inlet and outlet is preferably provided with an internal thread.

In the valve body there is an intermediate chamber 4 which is situated between a complete differential pressure control part 5—henceforth called the Δp-part 5—and a complete flow controlling part 6—henceforth called the control valve 6. The intermediate chamber is the space where the flow through the complete valve has passed the Δp-part and where the static pressure level in the medium/flow has a reduced pressure level, called P2, in relation to the pressure that exists before the complete valve—at the inlet 2—and where the pressure level is called P1. In FIG. 1 the pressure level after the complete valve—at the outlet 3—is called P3.

In the valve body, measuring nipples are also mounted, called 27a and 27b respectively.

The measuring nipple 27b is, via a signal channel 25, in contact with the intermediate chamber 4 and accordingly the pressure level is obtained in this chamber in connection with that, a measuring of the pressure is carried out.

The measuring nipple 27a is byway of a signal channel 26 in contact with the space that is situated immediately after the control valve 6 and accordingly the pressure level P3 is obtained in the measuring nipple 27b. The pressure level P1 can also be measured via the measuring nipple 27b.

The arrangement of the control valve 6 is not described in detail, because it is described in the separate Swedish application no. SE 0602073-9.

In principle the control valve 6 is working according to the following. The control valve has a seat 11 and a plug 18 and the plug is designed with slots in its periphery and the maximum flow through the valve is adjustable by one around the plug rotatable veil 24 which gives a varied opening outwards from the plug and to the outlet side of the valve and where the selected, maximum flow thereafter is limited by that, the plug is displaced axially by a separate actuator or by a knob mounted on the valve and where those alternative solutions presses down that spindle on which the plug is mounted and down towards a fixed mounted seat, when the flow through the control valve has to be reduced.

Figure 2:
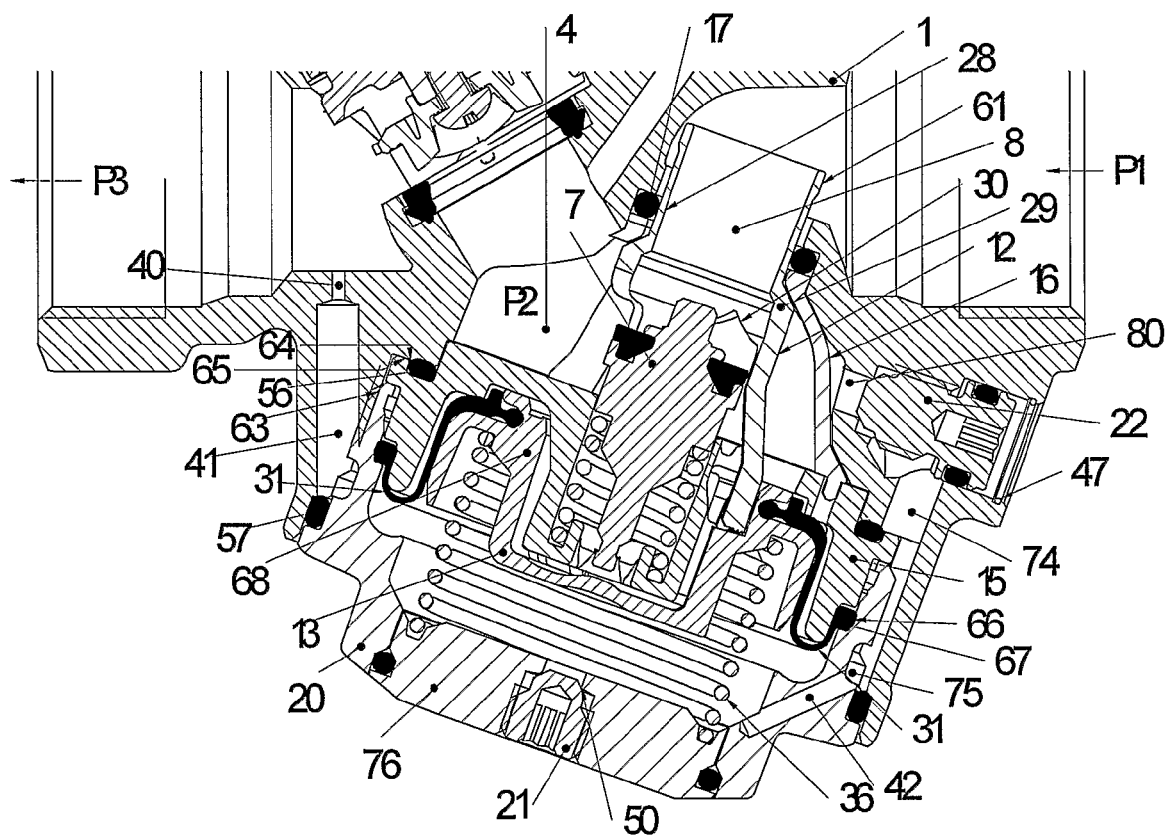
FIG. 2 and FIG. 3 shows a sectional view of a valve body according to the invention with the Δp-function in an open position, i.e. where the plug is open in relation to the seat.
Figure 3:
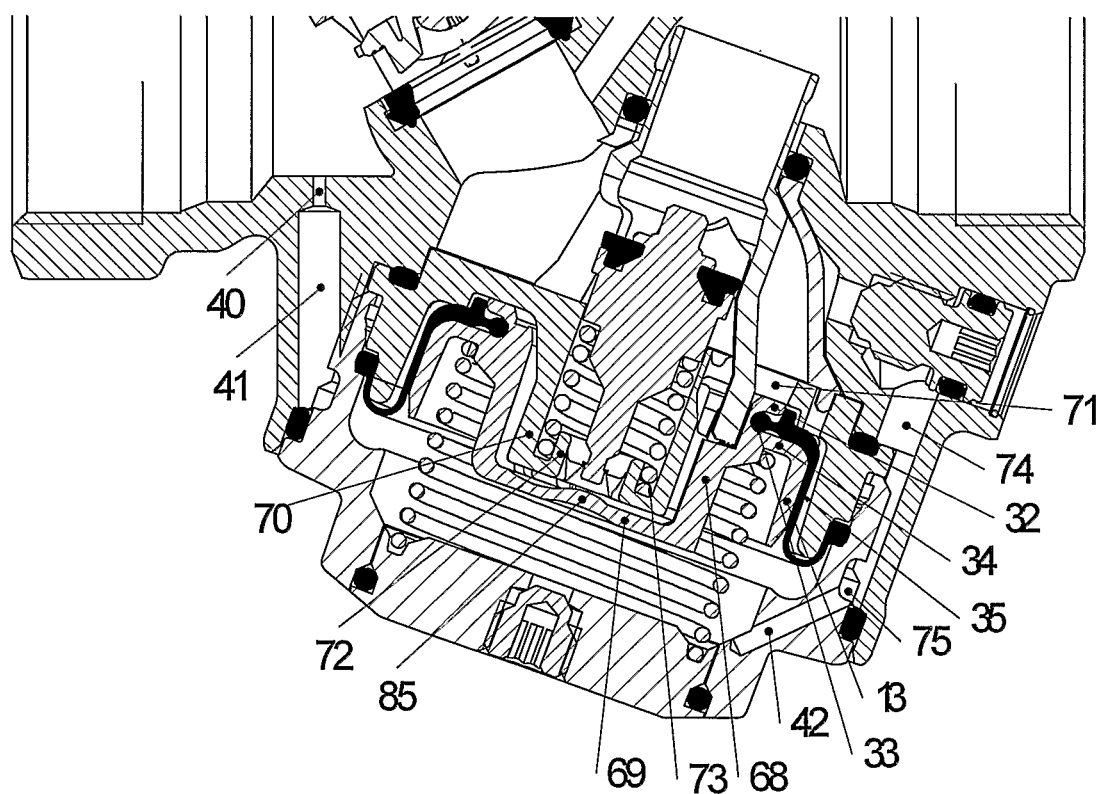

In FIG. 2-4 is shown how the Δp-part is build up.

FIG. 2 and FIG. 3 show the Δp-part in its open position, i.e. where the plug 8 is in its upper position, the position where it is situated furthest away from the seat 7.

In the present construction the plug 8 is movable and the seat 7 is indirectly firmly fixed in the valve body 1. The plug is designed with an outer or lower cylindrical part 28 which changes over to a second cylindrical part 29 with a slightly larger diameter. In the lower edge of the cylindrical part 29 there are recesses 30 which leads to that a successive opening of the passage takes place from the inlet side of the plug outwards to the intermediate chamber 4 in connection with a moving the plug away from the seat and against the inlet 2 of the complete valve and consequently the seat begins to move away from its sealing position against the plug. The function of the plug/seat in this Δp-part of the complete valve is also described in connection with FIG. 4.

In FIG. 2 it's evident that the plug is joined with a membrane support 13 via a number of, preferably 3, legs 12 in the plug. The legs are resilient and snapped into the cylindrical section 68 of the membrane support.

A plug sealing 17 is mounted in the valve body and is fixed with a plug sealing carrier 16.

The principal construction of the Δp-part is according to the following. The Δp-part is preferably produced as a complete unit. The unit is mounted in the valve body 1 and is mounted with its lower part 15 in the machined space, limited by a circumferential surface 63 with its bottom 64, against which the lower part 15 stops. The lower part 15 has an exterior plane 65, perpendicular to the longitudinal axis of the Δp-part, and in this plane 65 a sealing, preferably an o-ring, is inserted. This o-ring seals against the valve body so that the medium, the pressure, called P2, provided on the plug side of the lower part 15 can reach the other side of the lower part 15. The lower part is firmly held in this mounting position of the top part 20, which preferably is threaded together with the valve body 1. To prevent an outer leakage from the space above the top part, an o-ring 57 is provided between the top part and the valve body.

A membrane 31 is mounted beneath the lower part 15. In its periphery the membrane is carried out with an o-ring-like ending and this section is fixed between a cylindrical section 66 belonging to the top part 20 and a second cylindrical section 67 constituting a part of the lower part 15. The membrane is strongly wave shaped, with an intermediate zone formed like a U. In its inner part the membrane is supported by a membrane support 13 and where the membrane is fixed in a spherical circumferential groove 33 in this membrane support.

The membrane is also supported by the membrane support by that the inner leg of the U-shaped part of the membrane rests against a cylindrical section 35 of the support 13 and where the cylindrical section 35 extends in parallel with the longitudinal axis of the Δp-part. The cylindrical section 35 changes over by a radius section to a section 34, perpendicular to the section 35 reaching into a cylindrical section 68 and where the section 34 is finished with the spherical groove 33.

The membrane support has a further ring section 32 having only a short extension in radial direction above the section 34 and the spherical groove 33, in which the membrane is fixed.

Within the groove 33 the cylindrical section 68 is provided, which extends, in parallel with the outer section 35, against the top part 20. In its lower section the cylindrical section 68 changes over with some radius to a bottom 69.

Accordingly, the inner central part of the membrane support can be described as being designed as a container or a cup 85, where the cylindrical section 68 constitute the wall with a bottom 69.

Inside the cup 85 the seat 7 is indirectly mounted. The seat is namely mounted and guided in a cylinder 70 which is situated inside the cup 85 and where this cylinder is guided and centered by a number of wings 71 constituting a firm connection outwards to the lower part 15 and the seat has the same center line as the plug 8 and the valve passage 46. The cylinder 70 itself is slightly raised in relation to the bottom 69.

The seat 7 is mounted in the cylinder 70 and is fixed in a way that the seat in the end 72, which is situated inside the cylinder 70, partially has a narrowing cylindrical part with a slightly larger diameter in the part closest to the end 72 and in addition the seat is in this part provided with a chamfering, which means that the cylindrical basic form that the seat has, is altered to a more or less rectangular shape at the end 72. By this embodiment a locking facility is created for the seat to the cylinder 70, which in its bottom has a centrally located rectangular hole cooperating with the shape of the seat. By turning the seat for instance 90° after the end 72 has passed the cooperating hole in the cylinder, the seat is prevented from moving back and out of the cylinder 70. Also a spring 73 assists in maintaining the seat in its mounted position.

When the seat is mounted in the cylinder, the spring 73 as well is mounted within the cylinder. This is a security spring. It's approved so that in normal conditions the seat always seals against the plug in the position where the Δp-part completely closes the flow. If however the pressure P1 would reach abnormal values, this would result in that the seat is pressed down against the cylinder 70 by far too large forces. Instead of damages/breakages or deformations which then would occur in the Δp-part, the seat, with the present construction, will instead be loosened from the plug and this thanks that the seat can be displaced out of the bottom of the cylinder 70.

When the lower part 15, the membrane 31, and the membrane support 13 is mounted in the valve body the spring 36 is mounted as well.

It is the spring 36 and its features together with the physical measures by the details of the pressure receiving construction which determine the function of the Δp-part and that particularly considering the differential pressure to which the control valve 6 is exposed, or will be operating with.

The pressure P2 in the intermediate chamber 4 influences the membrane and the complete membrane support including the bottom 69, strives to press all against the top part 20.

Against P2 and the forces caused by P2 a counteracting force is acting, obtained by that the pressure P3 from the outlet side of the valve, at the outlet 3, has a communicating channel 41 with a slightly narrower part 40 closest to the outlet 3 and where those channels are machined in the valve body 1 and leads the pressure P3 further in a channel 42 in the top part 20 outwards into the space between the top part 20 and the membrane supports. Accordingly, the pressure P3 will, via the channels 40-42, be provided at the opposite side of the membrane and the membrane support parts in relation to the pressure level P2.

The force from the spring 36 is the force that has to balance the differences between the forces created by P2 and P3 respective on the membrane parts.

The function is described according to the following.

When no flow is provided in the system P1=P2=P3 comes. In this position the spring forces from the spring 36 pressing on the membrane support and the membrane will results in that the plug 8 will be removed to a fully open position in relation to the seat 7.

When the flow from the inlet 2 thereafter begins to flow through the valve the passage in the Δp-part is fully open to the control valve 6 and the result is that a large flow will be flowing through the valve 6 with the result that also a large pressure fall will arise in this valve 6. A large fall in pressure implies that a much lower pressure will be provided at the outlet 3 than at the inlet to the valve 6. At the inlet to the valve the intermediate chamber 4 is situated and this means that the pressure P2 in this case is almost the same as the pressure P1. P1 influences the membrane part which now is exposed to a large force, which acts against the spring force and since a large fall in pressure exists in the valve 6 the pressure will, after the valve 6, be much lower than the pressure before and this lower pressure will, via the channels 40-42, results in a counter force to the force from the P1-level which is provided on the opposite side of the membrane. But the differences between P1 and the pressure, which in this operating situation is provided in the outlet side is so large that the spring 36 will not be able to hold the plug fully open, so that at this moment a throttling of the flow will occur, resulting in that the intermediate chamber 4 will be provided with a lower pressure than P1, i.e. a new level=P2.

The new pressure P2 in the intermediate chamber 4 implies that the flow through the valve 6 is reduced and accordingly also a changing of the flow through the valve 6 takes place. If the flow through the valve 6 still is to large in relation to the flow at which the valve is preset, this means that also the fall in pressure is going to be too large and accordingly also the difference between P2 and the pressure after the valve=P3 will be too large. The spring force can in this position still not balance P2–P3. The result is that the spring has to be slightly compressed to be able to balance the forces that are caused by P2–P3.

After this last moving of the membrane and consequently of the plug 8 to a position slightly closer to the seat 7 the throttling between those parts will increase, which results in a decrease of the flow until a balance is achieved where the dynamic forces caused by P2 and P3 is in balance with the spring force. In this position the control valve 6 will be operating with the differential pressure, which, together with the preset selected for the valve 6, results in that the desired flow through the control valve is obtained and this with the desired fall in pressure ensuring that the control of the flow will not results in for instance some sound problems.

To ensure that no air is provided between the top part 20 and the space under the same, a venting valve 21 is mounted in the top part. The venting valve preferably has a metal sealing 50 to ensure a sealing outwards and the venting valve is preferably threaded into the top part.

In addition the venting valve 21 gives the construction the advantage that it is always possible to control that the channels 40-42 are open—water will be flowing from the outlet side 3 through the channels 40-42 when the venting valve is open—and that the pressure P3 actually influences the membrane and the membrane support parts in the zone where the spring 36 is mounted.

An additional function is built into the valve body, which implies that both the pressure P1 and P2 can be registered or measured in one and the same measuring nipple, the measuring nipple 27b.

This function is obtained by mounting, preferably via a threaded connection, a flushing spindle 22 in the valve body 1, and by placing it in a way that it in its closed, screw-in position, metallically seals an opening 80 into the intermediate chamber 4. When the flushing spindle is screwed out so that the medium can flow out to a preferably molded or machined channel 74 which leads to a ring shaped channel 75 which preferably is formed between a machined part, a machined groove in the top part 20, and the valve body 1 and where this channel 75 in turn is in direct contact with the channel 42 and accordingly also in contact with the space where the spring 36 is mounted. Those channels 74, 75 and 42 have a relative large passage, i.e. the fall in pressure through those channels is negligible and because no large flow is provided the pressure level after the channels 74 and 75 will be identical with the pressure level P2. In the point where the channel 75 meets the channel 42 also the channel 41 is provided, which via the channel 40 leads to the outlet side 3. By realizing the channel 40 with a small passage in relation to the other channels 74, 75 and 41, 42 the fall in pressure through the channels 74 and 75 will be negligible, while some fall in pressure occurs in the channel 40. Consequently, when the flushing spindle 22 is open, in principle the same pressure level, the one called P2, will be established on both sides of the membrane 31 and then the spring force will again open the plug 8 and in reality the P2 will be replaced by P1, i.e. in this position it is the pressure level P1 which counts in the intermediate chamber 4 and consequently also upwards through the signal channel 25 to the measuring nipple 27b.

An alternative method is to fully close the flow between the control valve 6, whereby naturally the pressure level P1 at the inlet 2 is propagated into the intermediate chamber 4 and upwards via the signal channel 25 to the measuring nipple 27b.

In that position where the flushing spindle 22 is open, a pressure equalizing, as is described above, will take place of the pressure levels on both sides of the membrane 31 and accordingly the spring 36 will move the plug 8 to the position where the passage through the Δp-part will be open. This means that a large flow can flow through the complete valve and so a flushing function is realized in the case when a flushing of the system is desired to be done without a need of further equipment, such as bypasses or the like, to be mounted, which would result in higher costs of the entire installation.

An additional function of the Δp-part is that the selected spring 36 and its features can be altered during operation.

By mounting a cap 76 in the top part 20, and where this cap preferably is threaded into the top part and where the spring 36 in its outer ends rests in or on this cap instead of resting directly against the top part, the function is obtained that the spring force of the selected spring is adjustable after installation and out in a plant, a plant which also is in operation.

By screwing the cap 76 out of and/or into the top part 20 the initial position of the spring 36 will be altered and this means that the force which the spring exerts on the membrane support will also be altered.

If the cap 76 is moved against the membrane part the forces of the spring will increase and vice versa. The advantage by this is that in the individual operational situations the considered Δp-value—P2 minus P3—will be adjusted. If the Δp-value is altered the flow through the control valve 6 will be altered at unaltered percentage opening at the same so that the real flows, through the system where the complete valve is installed, will be the calculated ones, those which should be obtained at a certain preset position of the control valve. It is not always that the theoretical calculated flows are obtained and this can be due to that the tube system or similar circumstances in reality are others than what was stated in the original documents.

Figure 4A:
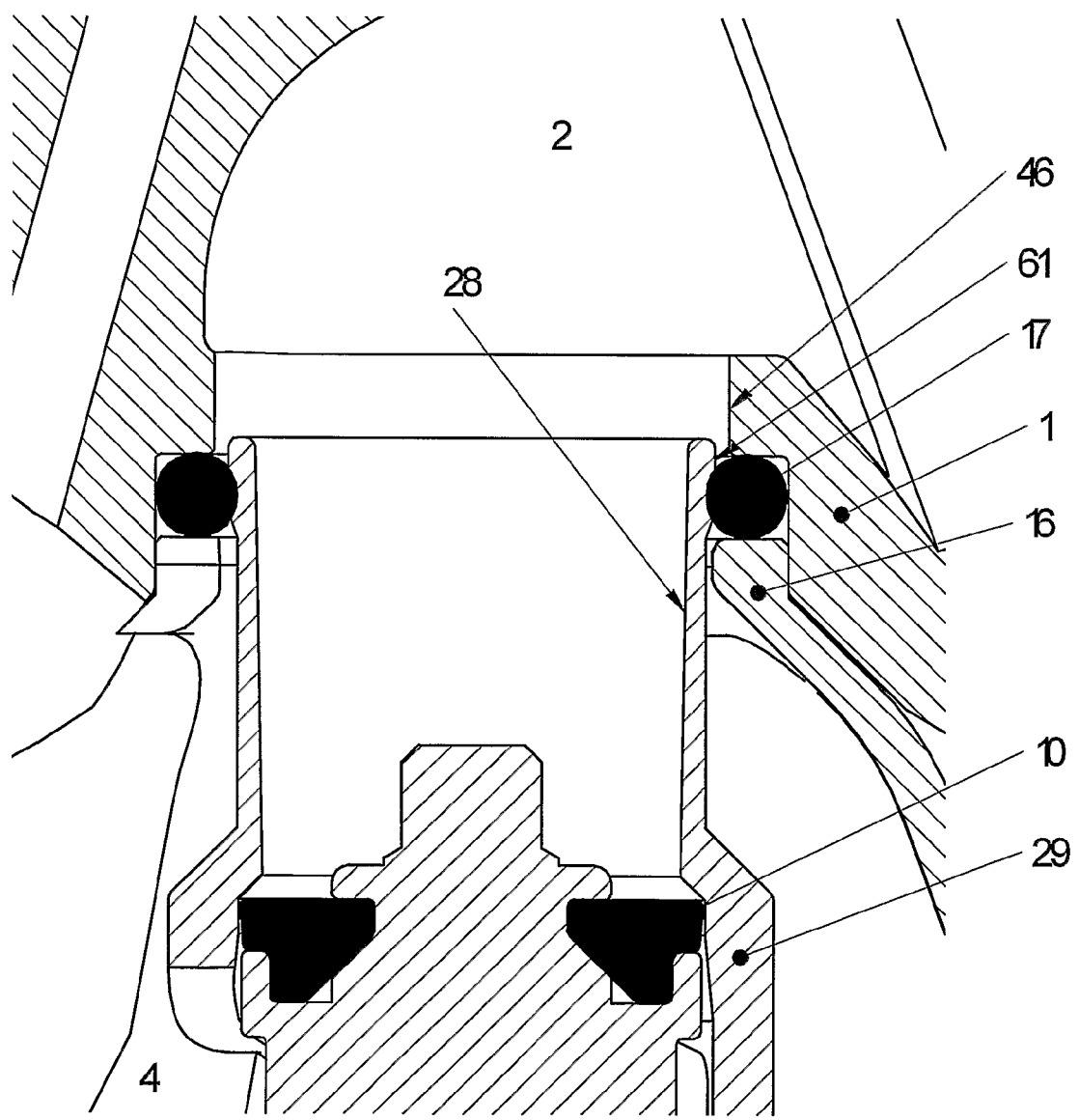
FIGS. 4A and 4B show views in detail of the seat/plug.

To further illustrate the structure and the function of the seat 7 and the plug 8 the Δp-part is shown closed in FIG. 4a, i.e. when the cylindrical part 28 of the plug seals against the valve body 1 with a plug sealing 17, preferably an o-ring, which is mounted in the valve body and its passage 46. The plug sealing 17 is additionally secured in its mounted position by the plug sealing carrier 16 which in its second end is fixed in the lower part 15. The passage 46 is preferably a machined part in the valve body, and constitutes the connection from the inlet 2 to the intermediate chamber 4. When the plug is in this closed position it also seals against the seat with its seat sealing 10. To minimize the friction between the plug sealing 17 and the plug, when the plug in its operational position is moved forwards and backwards, the plug sealing is pressed against the cylindrical part 28 only in the final closing position of the plug, and this thanks to that the cylindrical part has a slightly larger diameter 61 in its outermost part and accordingly the plug sealing therefore will get a stronger surface pressure against the cylindrical part, with its diameter 61, only in this closed position. In the remaining operational positions, when some flowing through takes place from the inlet 2 to the intermediate chamber 4 no total sealing is required at this sealing surface.

When the Δp-part is closed, the seat sealing 10 seals against the cylindrical part 29 of the plug.

Figure 4B:
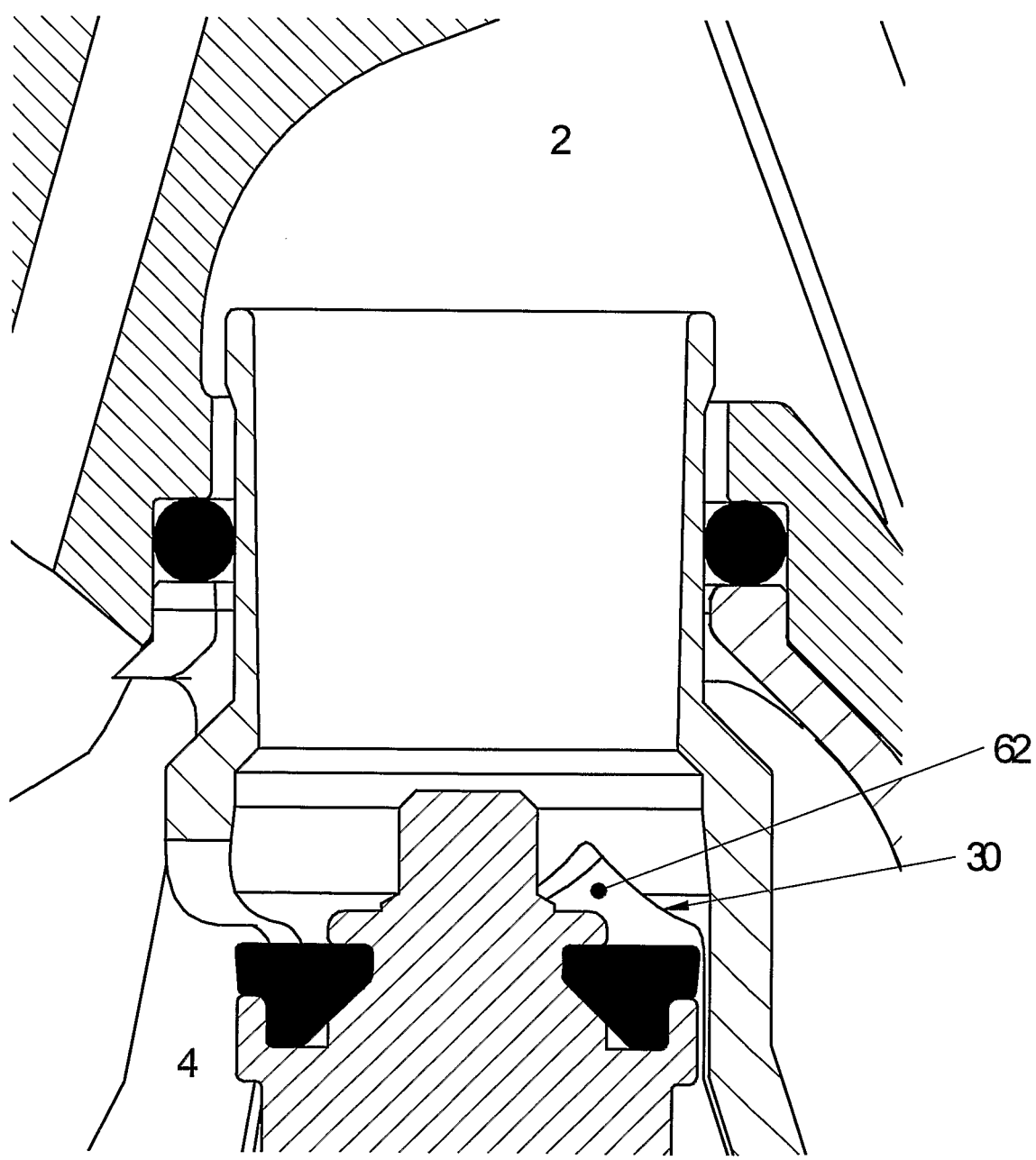

When the Δp-part is opened—see FIG. 4b—an opening from the inlet 2 of the valve to the intermediate chamber 4 is laid bare. When the plug 8 is moved a distance away from the seat 7 initially only small slits or openings 62 will be formed between the seat sealing 10 and the bottom of the recesses 30. Later, when the plug is moved further away from the seat 7 the opening from the inlet side outwards to the intermediate chamber will increase and this until the throttling of the flow results in that the desired flow through the flow control unit 6 occurs with the selected Δp-value over the same. The recesses 30 in the periphery of the plug are located at the lower edge of the plug, or at the zone which is located closest to the seat, and the recesses are shaped so that the medium flowing through, in particular at the beginning of the flowing through, will get a desired increase in the volume flow as a function of the extent by the opening of the plug in relation to the seat.

Figure 5:
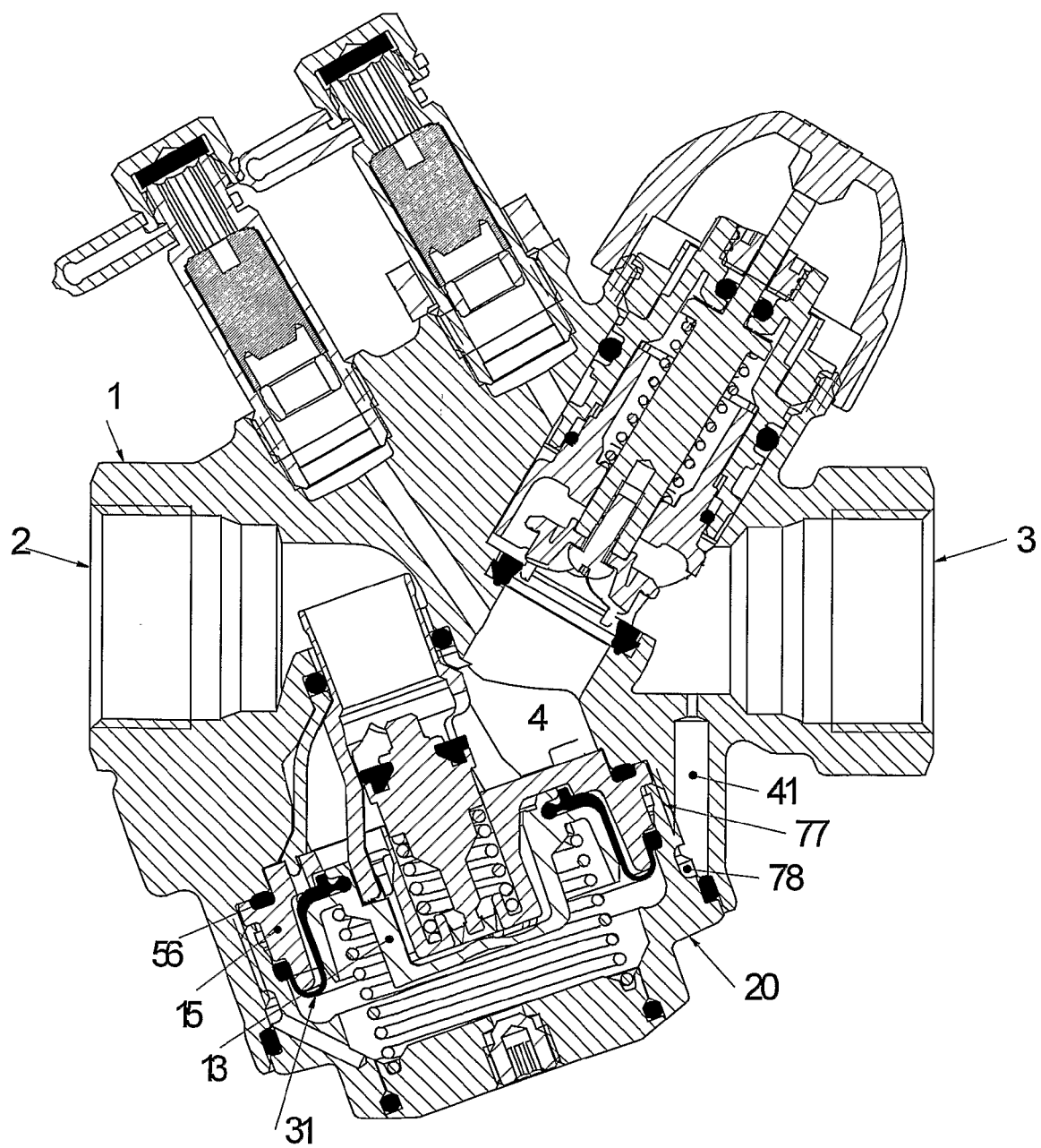
FIG. 5 shows a first alternative embodiment of the Δp-part.

FIG. 5 shows a first alternative embodiment of the Δp-part 5.

In this embodiment the structure of the entire Δp-part is altered compared to the embodiment described with reference to FIG. 2-4 above in a way that the flushing function is made in a totally different way.

In this first alternative embodiment the flushing spindle 22 is excluded. Also the machining of the valve body is partially altered. Accordingly the channel 74, that previous started from the zone with the flushing spindle and down to one around the top part 20 extending channel 75, which outwards connected both the space between the top part and the lower part of the membrane 31 and the connecting channels 40 and 41 respective to the outlet 3, is excluded.

In this first alternative embodiment a communication is created from the top side of the membrane, from the intermediate chamber 4, down to the space between the top part 20 and the underside of the membrane 31 by that the o-ring 56, which in normal operating position seals between the intermediate chamber and down to the space under the membrane, is laid bare from its fixed position. This is made by that the top part 20, which is threaded into the valve body via the threaded coupling 77 is screwed out of the valve body. As is evident from FIG. 5 the lower part 15 belonging to the membrane support 13 is attached directly to the top part 20, for instance via a snap in function between those both parts, and consequently it is the sealing between the lower part 15 and the valve body 1 that is laid bare when the top part 20 is threaded out.

A leakage at the o-ring 56 starts already at a small axial movement of the top part 20.

Preferably it's aimed that the top part is screwed out ca 0.5-1.0 turns to give a satisfactory leakage function, i.e. the pressure P2 is in reality also fully developed at the opposite side of the membrane 31. Thus, in this position, when the top part 20 is screwed out ca 0.5 turns, the medium and with that the pressure P2 will flow past the o-ring and further, via the threaded coupling 77, down to a zone where on the one hand the channel 41 meets the thread pitch or its extension and where the medium also can flow in to the underside of the membrane 31 via a channel 78 extending from the periphery of the top part and inwards to the inside of the top part and where this channel in vertical direction preferably is situated outside the threaded coupling.

In this first alternative embodiment of the Δp-part the remaining structure of the Δp-part and accordingly the entire function is the same as that according to the previous description of the Δp-part 5, with reference to the FIGS. 2-4.

Figure 6:
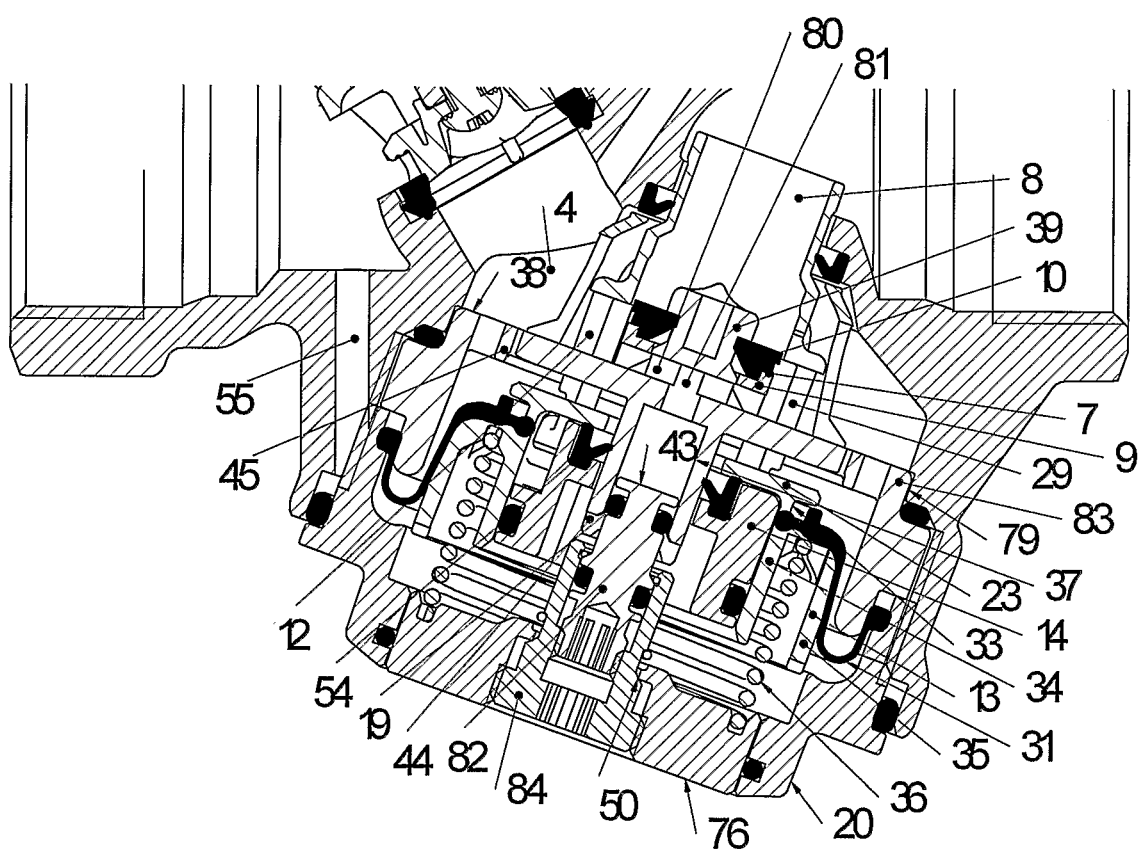
FIG. 6 shows a second alternative embodiment of the Δp-part.

FIG. 6 shows an alternative embodiment of how the Δp-part is build up.

FIG. 6 shows the Δp-part in its open position, i.e. when the plug 8 is in its upper position, the position where it is situated farthest away from the seat 7. Also in this alternative of embodiment the plug is moveable and the seat is fixed mounted in the valve body. Plug and seat are also in the remaining parts realized in the same way as is described above and according to FIGS. 2-4. Those legs 12 of the seat originating from the cylindrical part 29 at the plug are in this alternative embodiment of the Δp-part joined together with a locking detail 14, which is situated immediately on an interior interface of a base plate 23 of a membrane support 13. The locking detail 14 in turn is fixed to the membrane support 13. On this membrane support, the membrane 31 is mounted and fixed in a secure way between the base plate 23 of the membrane support and a spherical all around extending groove 33 provided between the upper interface of the base plate and one from this surface originating cylindrical section 34, which extend upwards from the base plate. Diametrically to the cylindrical section 34 and outside the same, an additional cylindrical section 35 is provided, whose extension in axial direction preferably is as large as for the section 34. This cylindrical section 35 originates from the groove 33 with a plane, perpendicular to the sections 34 and 35 and where this plane connects those sections, and constitutes simultaneously a support for the membrane 31.

In the interval between those both cylindrical sections a spring 36 is provided and where the spring in axial direction is clamped between the connecting part between the sections 34 and 35 respectively with the underside of the cap 76 in the top part 20.

The top part 20 fixes the alternative lower part 83 in an interior machining 79 in the valve body and the top part locks simultaneously the membrane 31 in its outer periphery.

This alternative lower part 83 has a plane 38, belonging to a bottom zone 45, where the plane 38 has a number of recesses and where those recesses are situated in a way that the legs 12 of the seat from the seat 8 fits in and goes through the bottom zone in a guided way, but still in a free running way. From the bottom zone a center section 37 extends outwards on both sides of the bottom zone. In direction of the plug 8 a pin 39 is provided. Approximately half the way outwards on this pin a waist is provided in which a seat sealing 10 is mounted and this seat sealing is fixed by a seat carrier 9 which is fastened between the seat sealing and the plane 38 of the bottom zone. The seat is in this construction constituted by the finishing part of the pin 39 which together with the seat sealing and the seat carrier constitute the entire seat 7.

The pin 39 has an interior cavity or channel 81 which is connected to the space outside the pin, that what is named the intermediate chamber 4 by one or a number of channels 80 perpendicular to the longitudinal axis of the pin and the center section 37 and where the channels 80 preferably are situated close to the bottom zone 45. The channel 81 extends through the center section and ends into the space within the top part 20. In its other end the channel preferably ends immediately above the channels 80. The center section 37 has in its outer part, added from the bottom zone 45, one or a number of holes or slots 44 opening a communication, a connection, from the intermediate chamber 4 to the space inside the top part 20 via the channels 80 and 81 in connection with that an interior in the channel 81 running spindle 82, an alternative realized flushing spindle, is screwed or moved out of the channel 81 until the lower end plane 43 of the flushing spindle gives a free passage for the medium from the intermediate chamber 4 to flow, via the holes or slots 44, out in the space where the spring 36 is mounted. By opening this communication the same pressure level is obtained on both sides of the membrane 31 and accordingly the passage of the Δp-part from the inlet 2 to the intermediate chamber 4 and accordingly a flushing possibility exists through the complete valve in principle in the same way as in the preceding, described alternatives embodiments.

The flushing spindle 82 is preferably mounted inside a venting valve 84 which in turn is mounted in the cap 76. Naturally the flushing spindle and the venting valve can be mounted separated from each other, but this alternative must be seen as a solution that lies near at the hand. The flushing spindle is in the present device threaded into the venting valve 84. The thread make it possible that the spindle 82 is displaceable inside the venting valve and this on a functional ensured way so that the flushing spindle is prevented from an unintentional withdrawing from the venting valve or from the cap 76. Moving the flushing spindle in an axial direction is preferably done with an Allen wrench that can be applied in the outer or upper end of the flushing spindle provided with corresponding machining.

The flushing spindle is normally, in the normal working position of the complete valve, mounted in its screw-in position, where the communication between the intermediate chamber 4 and the space within the top part 20 is closed.

The venting valve 84 is preferably threaded into the cap 76 and preferably in a center section of this cap. The venting valve is designed in a way so that it in its closed position, the position which is the normal working position, has a metallic sealing 50 between the valve and the cap 76. When a venting of the space between the top part 20 and the membrane 31 has to be done, the venting valve is threaded down, whereby air and thereafter liquid is flowing out from the space under the top part. To ensure that the venting valve cannot be threaded down to far, so that it for instance could be pressed on the end surface of the center section 37 and so damage the same, the stroke or the mounting length the of venting valve is limited in an efficient way.

To ensure a sealing from the intermediate chamber 4 at the passage of the center section 37 in the membrane support and its ring section 32 a sealing element 64 is mounted and this so that the pressure level P2 not in a uncontrolled way will propagate into the space between the top part 20 and the membrane 31. Of the same reason an o-ring is mounted to ensure a sealing between the flushing spindle 82 and the inside of the center section 37.

In the space where the spring 36 is mounted the pressure level is the same as in the outlet 3 and the pressure is called P3. The pressure P3 from the outlet propagates via a channel 55 into the space within the top part 20 and to the space where the spring 36 is mounted.

In this second alternative embodiment of the Δp-part the general structure of the Δp-part, and accordingly the entire function is the same as that what is applicable according to the previous description of the Δp-part 5, with reference to the FIGS. 2-4.

Accordingly, the requirements that the pressure level P2 in the intermediate chamber 4 do not propagate to the opposite side of the membrane 31 is crucial. On the other hand the pressure P2 should be, in a controlled way, obtainable on both sides of the membrane in a way that is described above.

The complete Δp-part in this second, alternative embodiment will fulfill all functions—venting, flushing through of the tube system, adjustment of the bias of the spring and measuring of all pressure levels P1, P2 and P3, principally in the same way as the previous described alternatives of embodiments.

| COMPONENT LIST | | |
|---|---|---|
| 1 = valve body | 2 = inlet | 3 = outlet |
| 4 = intermediate chamber | 5 = Δp-part | 6 = control valve |
| 7 = seat | 8 = plug | 9 = seat carrier |
| 10 = seat sealing | 11 = seat | 12 = leg of plug |
| 13 = membrane support | 14 = locking detail | 15 = lower part |
| 16 = plug sealing carrier | 17 = plug sealing | 18 = plug |
| 19 = O-ring | 20 = top part | 21 = venting valve |
| 22 = flushing spindle | 23 = base plate | 24 = veil |
| 25 = signal channel | 26 = signal channel | 27 = measuring nipple |
| 28 = cylindrical part | 29 = cylindrical part | 30 = recess |
| 31 = membrane | 32 = ring section | 33 = groove |
| 34 = section | 35 = cylindrical section | 36 = spring |
| 37 = center section | 38 = plane | 39 = pin |
| 40 = cannel | 41 = channel | 42 = channel |
| 43 = lower end plane | 44 = hole | 45 = bottom zone |
| 46 = passage | 47 = locking ring | 48 = flange |
| 49 = flange | 50 = metal sealing | 51 = locking ring |
| 53 = lower edge | 54 = sealing element | 55 = channel |
| 56 = O-ring | 57 = O-ring | 61 = diameter |
| 62 = opening | 63 = periphery surface | 64 = bottom |
| 65 = outer plane | 66 = cylindrical section | 67 = cylindrical section |
| 68 = cylindrical section | 69 = bottom | 70 = cylinder |
| 71 = wings | 72 = end | 73 = spring |
| 74 = channel | 75 = channel | 76 = cap |
| 77 = threaded coupling | 78 = channel | 79 = machining |
| 80 = channel | 81 = channel | 82 = flushing spindle |
| 83 = lower part | 84 = venting valve | 85 = cup |

The invention claimed is:

1. A device for regulating and controlling flow in a heating and cooling system, the device comprising:
a complete valve body (1) with an inlet (2) and an outlet (3), first and second valve functions being mounted in the valve body, the first function in a flow direction is a difference pressure valve (5) with a seat (7) and a plug (8) and the second function in the flow direction is a flow control valve (6) with a seat (11) and a plug (18),
an intermediate chamber (4) being arranged between the first and the second valve functions,
first and second measuring nipples (27b, 27a) being mounted in the valve body for registering first, second and third static pressures (P1, P2, P3),
the valve body being controlled, depending on the second and the third static pressures (P2, P3), to generate a required pressure difference between the second and the third static pressures (P2, P3), and a magnitude of the required pressure difference is primarily set by a spring (36), the spring being adjustable during operation, the spring (36) biases a membrane (31) which, in turn, influences axial movement of the plug (8) such that, during operation, a pressure level between the plug (8) and the seat (7) of the difference pressure valve (5) is throttled from the first static pressure (P1) to the second static pressure (P2), to provide conditions for the flow control valve (6) to work with the required pressure difference between the second static pressure (P2) and the third static pressure (P3),
a level of the third static pressure (P3) in the outlet (3) is in contact, via first, second and third channels (40, 41, 42) with a space between the membrane (31) and a top part (20) in the valve body (1), all of the first static pressure (P1) at the inlet (2) of the valve body, the second static pressure (P2) in the intermediate chamber (4) and the third static pressure (P3) after the flow control valve (6) in the outlet (3) of the valve body are measured and registered via the first and the second measuring nipples (27a, 27b), both of the first and the second static pressures (P1, P2) being registered in the second measuring nipple (27b) whereby the registration of the first static pressure (P1) presumes that either the flow control valve (6), or another separate valve after the valve body, is closed, or that a flushing spindle (22) in the difference pressure valve (5) is open, whereby a common pressure level is obtained on both sides of the membrane (31) which facilitates adjustment of the spring (36) such that the plug (8) opens in relation to the seat (7) of the difference pressure valve and a passage is opened from the inlet (2) into the intermediate chamber (4) such that the first static pressure (P1) is provided also in the intermediate chamber and consequently, via a first signal channel (25), in the valve body (1) upwards to the second measuring nipple (27b) while the third static pressure (P3) after the control valve (6) leads to the first measuring nipple (27a) via a second signal channel (26) in the valve body (1) from the outlet side (3) to the first measuring nipple (27a).

2. The device according to claim 1, wherein the complete valve is mounted in a tube system which is flushable, during operation, by opening of the flushing spindle (22) mounted in the valve body (1) and when the flushing spindle is screwed out from a closed position where the flushing spindle, in a normal working position, seals against the intermediate chamber (4), medium in the normal working position of the flushing spindle flows out from the intermediate chamber (4), via a fourth channel (74), a fifth channel (75) and the third channel (42) to a space where the spring (36) is mounted, such that the second static pressure (P2) which is provided in the intermediate chamber (4) is obtained on both of the sides of the membrane (31) and a spring force from the spring (36) will bias the plug (8) from the seat (7) of the difference pressure valve such that the difference pressure valve (5) is positioned to not throttle the flow and to facilitate flushing through of the tube system.

3. The device according to claim 1, wherein the complete valve is mounted in a tube system which is flushable, during operation, by moving the top part (20) mounted in the valve body, out from the valve body whereby an O-ring (56) is laid bare from a tightened sealing position such that a medium in the intermediate chamber (4), at the second static pressure (P2), flows, via a threaded coupling (77) and a fourth channel (78), into the space between the membrane and the top part where the spring (36) is mounted whereby the second static pressure (P2), which is provided in the intermediate chamber (4), is obtained on both sides of the membrane (31) and accordingly a spring force from the spring (36) biases the plug (8) from the seat (7) of the difference pressure valve such that the difference pressure valve (5) is positioned to not throttle the flow and facilitate flushing through of the tube system.

4. The device according to claim 1, wherein a medium with the third static pressure (P3) in the outlet (3) communicates, via the first channel (40), the second channel (41) and the third channel (42), with the space between the membrane (31) and the top part (20) such that the first, the second and the third channels are open when a flow is provided through an opened venting valve (21).

5. The device according to claim 1, wherein the difference pressure valve (5) is mounted in the valve body (1) by the top part (20) which fixes a lower part (15) in the valve body (1) and a periphery of the membrane (31) is locked between a first cylindrical section (66) of the top part (20) and a second cylindrical section (67) of the lower part (15) while a membrane on an inside of its U-formed part is supported by a membrane support (13) and rests on a first section (34) perpendicular to a longitudinal axis of the difference pressure valve (5), the first section (34) constitutes a part of the membrane support (13) and the membrane is fixed in a spherical, circumferential groove (33) which is formed between the first section (34) of the membrane support and a second ring section (32) in parallel with the first section (34) situated directly above an inner part of the membrane.

6. The device according to claim 1, wherein the plug (8) of the difference pressure valve (5), in a closed position, seals against a plug sealing (17) which is mounted at a passage (46) in the valve body (1), the external seal occurs where the plug has an outer diameter (61) which is slightly larger than a cylindrical part (28) of the plug which, in normal operational positions, is moved up and down in relation to the plug sealing (17).

7. The device according to claim 1, wherein the plug (8) of the difference pressure valve (5), in a closed position, seals against a seat sealing (10) which seals against a cylindrical part (29) of the plug and when the plug opens, the seat sealing (10) will loses contact with the plug because the cylindrical part (29) of the plug ends up essentially immediately after the seat sealing and changes over into three plug legs (12), connecting the plug with the difference pressure valve (5) and the membrane support (13).

8. A device for regulating and controlling flow in a heating and cooling system, the device comprising:

a complete valve body (1) with an inlet (2) and an outlet (3), first and second valve functions being mounted in the valve body, the first function in a flow direction is a difference pressure valve (5) with a seat (7) and a plug (8) and the second function in the flow direction is a flow control valve (6) with a seat (11) and a plug (18), an intermediate chamber (4) being arranged between the first and the second valve functions, first and second measuring nipples (27b, 27a) being mounted in the valve body for registering first, second and third static pressures (P1, P2, P3), the valve body being controlled, depending on the second and the third static pressures (P2, P3), to generate a required pressure difference between the second and the third static pressures (P2, P3), and a magnitude of the required pressure difference is primarily set by a spring (36), the spring being adjustable during operation, the spring (36) biases a membrane (31) which, in turn, influences axial movement of the plug (8) such that, during operation, a pressure level between the plug (8) and the seat (7) of the difference pressure valve (5) is throttled from the first static pressure (P1) to the second static pressure (P2), to provide conditions for the flow control valve (6) to work with the required pressure difference between the second static pressure (P2) and the third static pressure (P3), a level of the third static pressure (P3) in the outlet (3) is in contact, via at least one channel (55) with a space between the membrane (31) and a top part (20) in the valve body (1), all of the first static pressure (P1) at the inlet (2) of the valve body, the second static pressure (P2) in the intermediate chamber (4) and the third static pressure (P3) after the flow control valve (6) in the outlet (3) of the valve body are measured and registered via the first and the second measuring nipples (27a, 27b), both of the first and the second static pressures (P1, P2) being registered in the second measuring nipple (27b)

whereby the registration of the first static pressure (P1) presumes that either the flow control valve (6), or another separate valve after the valve body, is closed, or that a flushing spindle in the difference pressure valve (5) is open, whereby a common pressure level is obtained on both sides of the membrane (31) which facilitates adjustment of the spring (36) such that the plug (8) opens in relation to the seat (7) of the difference pressure valve and a passage is opened from the inlet (2) into the intermediate chamber (4) such that the first static pressure (P1) is provided also in the intermediate chamber and consequently, via a first signal channel (25), in the valve body (1) upwards to the second measuring nipple (27*b*) while the third static pressure (P3) after the control valve (6) leads to the first measuring nipple (27*a*) via a second signal channel (26) in the valve body (1) from the outlet side (3) to the first measuring nipple (27*a*);

the complete valve is mounted in a tube system which is flushable, during operation, and because the flushing spindle, mounted in a center section (37) with an inner channel (81) of a lower part (83), is moved along the inner channel (81) of the lower part (83) until an end plane (43) of the central part (37) to open a passage for the medium from the intermediate chamber to flow, via either a hole or slots (44) in the central part (37), to out into a space where the spring (36) is mounted, whereby the second static pressure (P2), which is provided in the intermediate chamber (4), is obtained on both sides of the membrane (31) and a spring force of the spring (36) biases the plug (8) from the seat (7) of the difference pressure valve such that the difference pressure valve (5) is positioned to facilitate the flow of medium and flushing through of the tube system.

\* \* \* \* \*